US010859232B2

(12) United States Patent
Hibari et al.

(10) Patent No.: US 10,859,232 B2
(45) Date of Patent: Dec. 8, 2020

(54) VEHICLE LAMP

(71) Applicant: Ichikoh Industries, Ltd., Isehara (JP)

(72) Inventors: Yukihiro Hibari, Isehara (JP); Masaru Saito, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 16/481,949

(22) PCT Filed: Jan. 31, 2018

(86) PCT No.: PCT/JP2018/003153
§ 371 (c)(1),
(2) Date: Jul. 30, 2019

(87) PCT Pub. No.: WO2018/143251
PCT Pub. Date: Aug. 9, 2018

(65) Prior Publication Data

US 2020/0041095 A1 Feb. 6, 2020

(30) Foreign Application Priority Data

Jan. 31, 2017 (JP) ................................ 2017-015973

(51) Int. Cl.
*B60Q 1/00* (2006.01)
*F21S 45/33* (2018.01)

(52) U.S. Cl.
CPC .................................... *F21S 45/33* (2018.01)

(58) Field of Classification Search
CPC .. F21S 41/00; F21S 43/00; F21S 45/00; F21S 45/30–465; F21V 31/03
USPC ........................ 362/294, 345, 373, 507, 547
See application file for complete search history.

(56) References Cited

FOREIGN PATENT DOCUMENTS

| | | | | |
|---|---|---|---|---|
| JP | 60-22709 U | | 2/1985 | |
| JP | 1-150304 U | | 10/1989 | |
| JP | 6-45203 U | | 6/1994 | |
| JP | 7-230708 A | | 8/1995 | |
| JP | 10-340603 A | | 12/1998 | |
| JP | 2001184940 A | * | 7/2001 | ............. F21S 45/37 |
| JP | 2016-46105 A | | 4/2016 | |

OTHER PUBLICATIONS

International Search Report dated Mar. 13, 2018 in PCT/JP2018/003153 filed Jan. 31, 2018.
Combined Chinese Office Action and Search Report dated May 6, 2020, in Patent Application No. 201880008331.6 (with English translation), citing documents AO and AP therein, 14 pages.

* cited by examiner

*Primary Examiner* — Jason M Han
(74) *Attorney, Agent, or Firm* — Oblon, McClelland, Maier & Neustadt, L.L.P.

(57) ABSTRACT

A vehicle lamp capable of reliably preventing dust from entering a lamp chamber is equipped with a lamp housing provided with a breathing hole, and a cap provided with a breathing port. The breathing hole is positioned above the breathing port. A breathing passage is provided between the lamp housing and the cap. A projecting part is provided on the lamp housing. The tip of the projecting part and the cap form a throttle part therebetween. As a result, it is possible to reliably prevent dust from entering a lamp chamber.

8 Claims, 6 Drawing Sheets

VEHICLE LAMP

TECHNICAL FIELD

The present invention relates to a vehicle lamp having a breathing structure.

BACKGROUND ART

A vehicle lamp having the breathing structure is shown in PTL 1 and PTL 2, for example. A ventilation structure of the vehicle headlamp of the PTL 1 includes a dust removing means provided in a vent hole formed in a housing to inhale air into the housing through the dust removing means. The dust removing means includes a case having an inlet and an outlet at the upper and lower sides and a tube connected to the inlet and the outlet respectively in the case, and the tube on the inlet side is arranged to be inside the tube on the outlet side. The ventilation structure of the vehicle headlamp of the PTL 1 can cause dust with harmful size to drop by the inertia force into the tube on the inlet side and the tube on the outlet side, and to discharge from the outlet to the outside.

Further, the vehicle lamp of the PTL 2 has an air hole for performing a breathing action in a lamp body, a cylinder provided such that the cylinder surrounds the air hole on the lamp body, a partition wall provided in the inside of the cylinder, a slit provided at the lower wall of the cylinder, a cap fitted at the tip of the cylinder while leaving a part of the slit, and an air passage with a maze shape communicating with the inside of the lamp body through the air hole in the cylinder.

The vehicle lamp of the PTL 2 can prevent water from entering into the lamp body because the air passage is the maze shape.

CITATION LIST

Patent Literature

PTL 1: Japanese Utility Model Publication No. Hei 6-45203

PTL 2: Japanese Unexamined Patent Publication No. Hei 10-340603

SUMMARY OF THE INVENTION

Problems to be Solved by the Invention

However, although the ventilation structure of the vehicle headlamp of the PTL 1 can cause dust with harmful size to drop by the inertia force into the tube on the inlet side and the tube on the outlet side, and to discharge from the outlet to the outside, there is a case that it cannot cause small dust to drop by the inertia force into the tube on the inlet side and the tube on the outlet side, and to discharge from the outlet to the outside, and there is a case that the small dust may enter the housing.

Also, although the vehicle lamp of the PTL 2 can prevent water from entering the lamp body due to the air passage with the maze shape, there is a case that dust may enter the lamp body through the air passage with the maze shape and the air hole.

It is an object of the present invention to provide a vehicle lamp capable of reliably preventing dust from entering a lamp chamber.

Means for Solving the Problem

A vehicle lamp of the present invention includes a lamp housing comprising a lamp chamber and a breathing hole communicating with the lamp chamber, and a cap provided on an opposite side to the lamp chamber of the lamp housing, the cap covering a peripheral portion of the breathing hole and comprising a breathing port communicating with an outside, wherein the breathing hole is positioned above the breathing port, and a breathing passage is provided between a portion covered with the cap of the lamp housing and the cap to communicate between the breathing hole and the breathing port, and a projecting part is provided on the lamp housing to throttle the breathing passage.

In the vehicle lamp of the present invention, it is preferable that an upper surface of a tip portion of the projecting part is provided with a slop inclined upward toward the breathing hole.

In the vehicle lamp of the present invention, it is preferable that the breathing passage includes a first breathing passage on a side of the breathing hole with respect to the projecting part, a second breathing passage on a side of the breathing port with respect to the projecting part, and a throttle part between the tip of the projecting part and the cap, and an auxiliary projecting part projecting toward the lamp housing in the second breathing passage is provided alternately with the projecting part at or near a portion of the cap where the tip portion of the projecting part faces.

In the vehicle lamp of the present invention, it is preferable that a recess recessed toward the lamp chamber is provided on a root portion on a side of the second breathing passage of the projecting part of the lamp housing.

In the vehicle lamp of the present invention, it is preferable that the portion of a side of the first breathing passage of the cap includes a hollow rectangular shape or a hollow cubic shape.

In the vehicle lamp of the present invention, it is preferable that the cap includes a flat wall covering the breathing hole, a front wall and right and left side walls, and ribs in contact with one of a side of the first breathing passage and a side of the second breathing passage of the left and right sides of the tip portion of the projecting part are respectively provided on the inner surfaces of the front wall and the left and right side walls of the cap.

Effect of the Invention

The vehicle lamp of the present invention can provide a vehicle lamp capable of reliably preventing dust from entering the lamp chamber.

MODE FOR CARRYING OUT THE INVENTION

Figure 1:
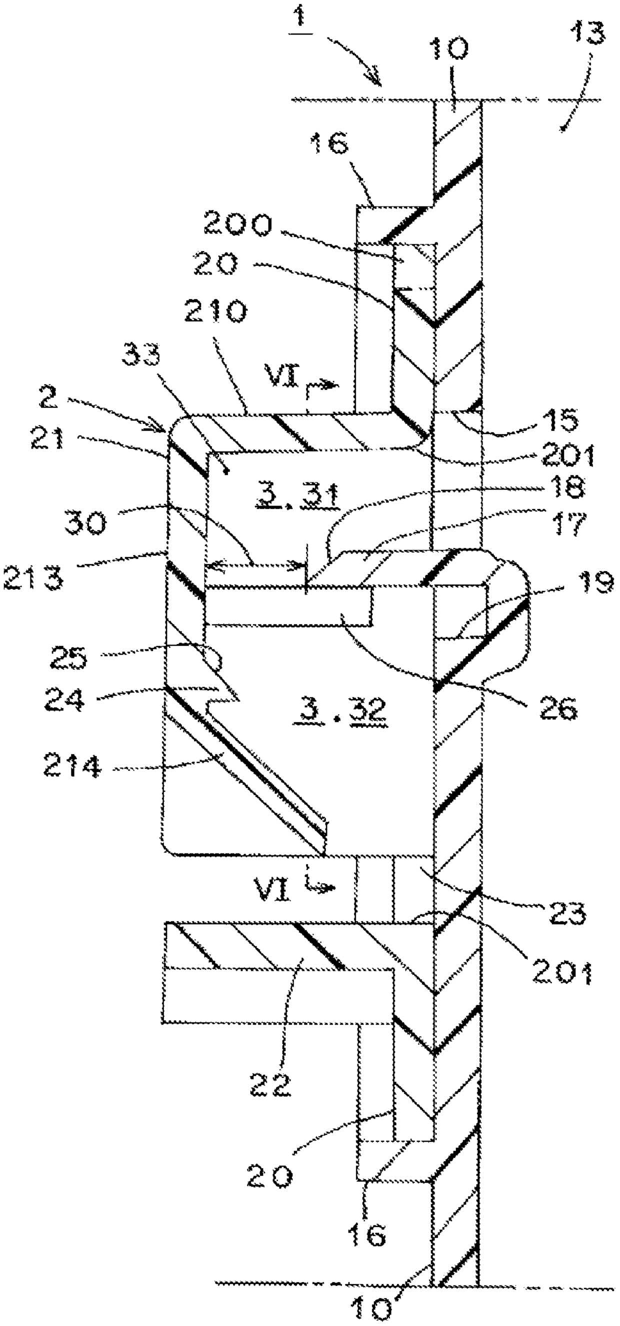
FIG. 1 is a longitudinal cross-sectional view (vertical cross-sectional view, a cross-sectional view taken along line I-I in FIG. 4) of a main portion showing an embodiment of a vehicle lamp according to the present invention.

Hereinafter, an example of an embodiment (example) of a vehicle lamp according to the present invention will be described in detail based on the drawings. In the specification and the attached claims, the front, rear, upper, lower, left and right are front, rear, upper, lower, left and right when the vehicle lamp according to the present invention is installed in the vehicle.

Note that since the drawings are schematic, the drawings illustrate the main parts, and the illustration of parts other than the main parts is omitted.

Description of the Embodiments

Hereinafter, the configuration of a vehicle lamp according to the embodiment will be described. In the figures, the reference numeral 1 denotes the vehicle lamp according to the embodiment.

Description of Vehicle Lamp 1

Figure 2:
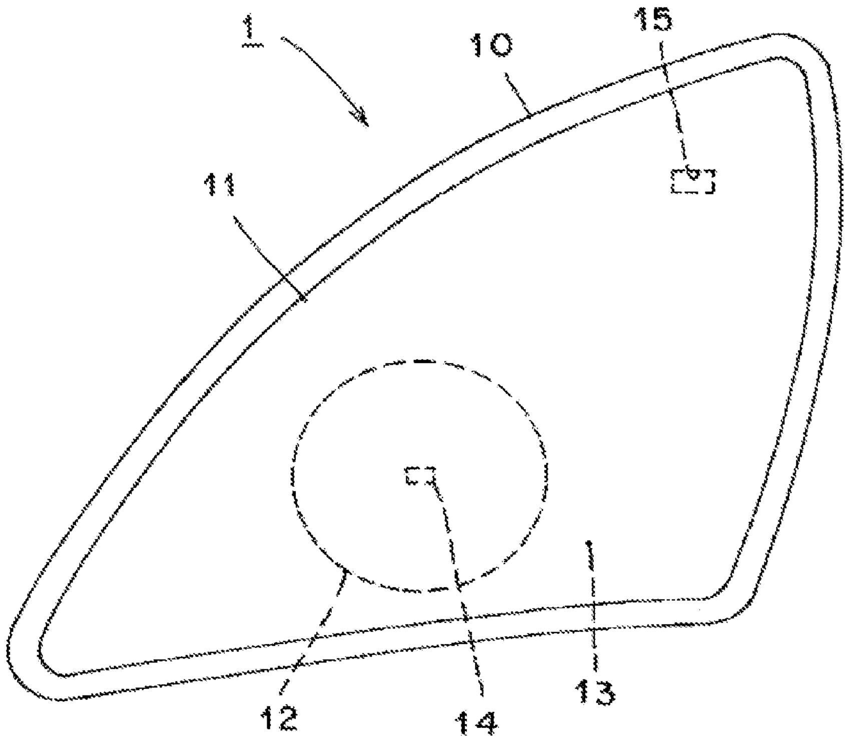
FIG. 2 is a schematic front view showing an embodiment as a vehicle headlamp (head lamp).

In this example, the vehicle lamp 1 is a vehicle headlamp (head lamp) installed on both left and right sides of the front portion of the vehicle. As shown in FIG. 2, the vehicle lamp 1 includes a lamp housing 10, a lamp lens 11, a lamp unit 12, and a cap 2.

The lamp housing 10 is made of, for example, a light impermeable member (resin member or the like). The lamp lens 11 is made of, for example, a light transmissive member (resin member or the like). A lamp chamber 13 is partitioned by the lamp housing 10 and the lamp lens 11. The lamp unit 12 is disposed in the lamp chamber 13.

The lamp unit 12 includes a light source 14 including a self-luminous semiconductor light-emitting element (semiconductor light-emitting element) such as LED, OEL and OLED (organic EL). The lamp unit 12 transmits at least one light distribution pattern of a low-beam light distribution pattern (a light distribution pattern for passing) and a high-beam light distribution pattern (a light distribution pattern for traveling) through the lamp lens 11 and irradiates the front of the vehicle. The lamp unit 12 is attached to the lamp housing 10 via an optical axis adjustment mechanism (an aiming mechanism and a swivel mechanism).

Description of Lamp Housing 10

As shown in FIG. 2, a breathing hole 15 is provided at a position apart from the lamp unit 12 in the lamp housing 10. The breathing hole 15 communicates with the lamp chamber 13 as shown in FIG. 1. That is, the breathing hole 15 communicates between the inside (the side of the lamp chamber 13) and the outside (the opposite side to the lamp chamber 13 and the external side) of the lamp housing 10. In this example, the breathing hole 15 has a rectangular shape which is long in the horizontal direction.

Figure 3:
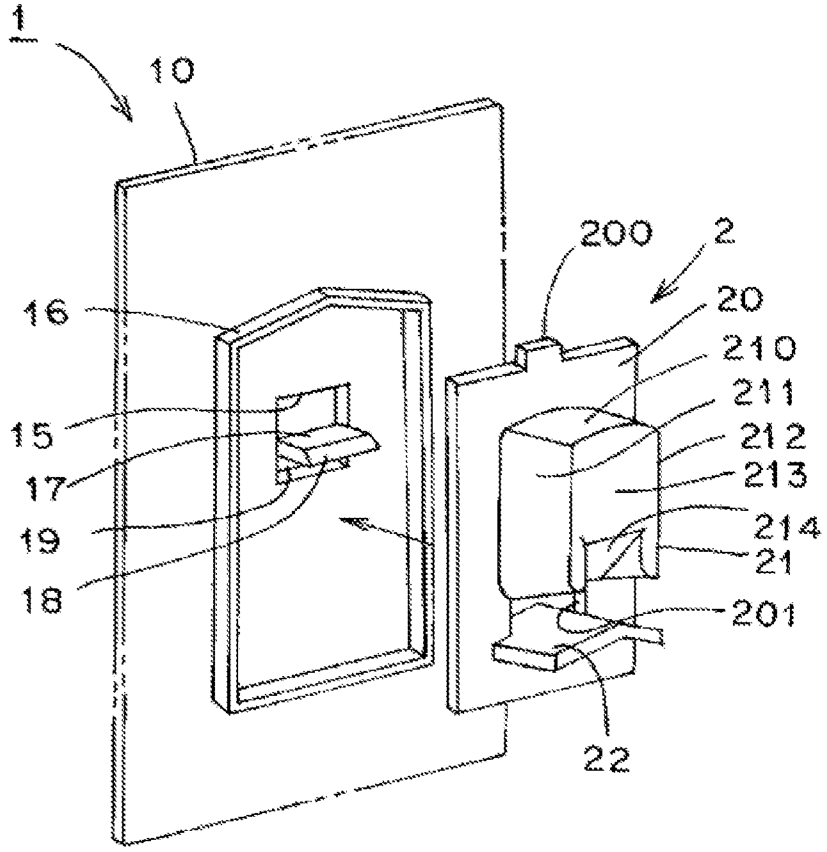
FIG. 3 is a perspective view showing a part of a lamp housing and a cap as viewed from the rear upper diagonal side.
Figure 4:
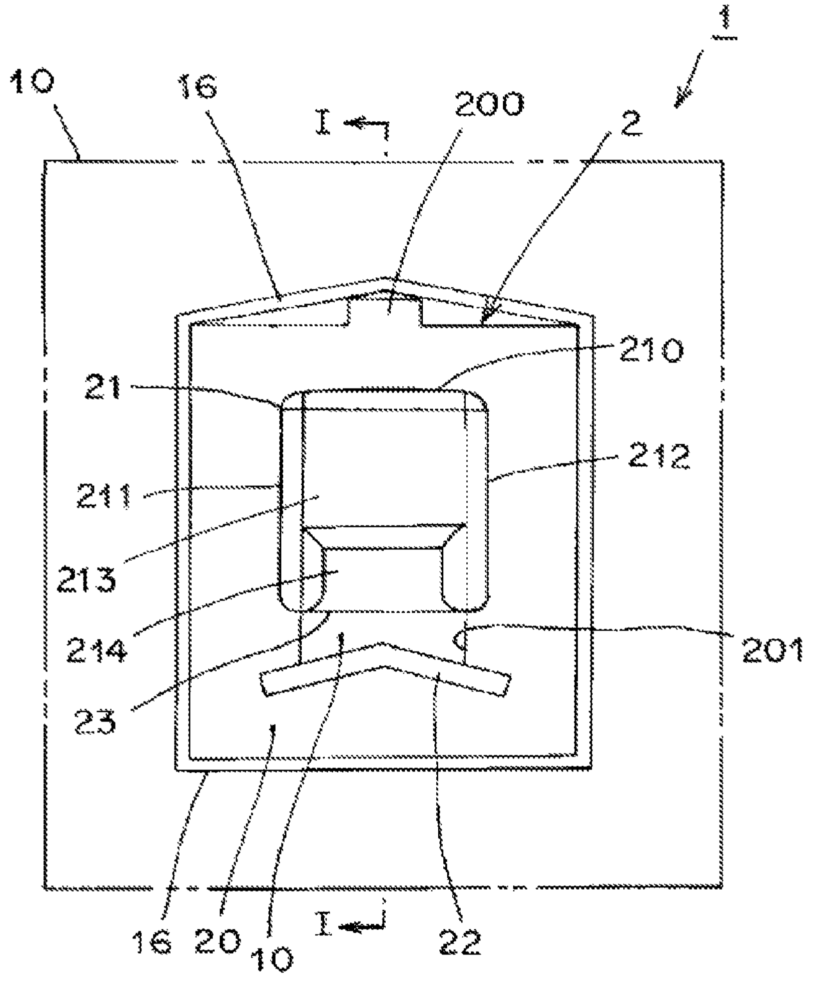
FIG. 4 is a rear view showing a state in which the cap is assembled to the lamp housing.

As shown in FIG. 3 and FIG. 4, a mounting convex portion 16 is integrally provided on the outer surface of the lamp housing 10 so as to surround the breathing hole 15. The mounting convex portion 16 has a substantially rectangular frame shape which is long in the longitudinal direction. The upper side of the mounting convex portion 16 has a chevron shape (a shape in which the center is bent upward at an obtuse angle), and the right and left sides and the lower side of the mounting convex portion 16 has a straight shape. The portion of the lamp housing 10 where the breathing hole 15 and the mounting convex portion 16 are provided has a flat plate shape or a substantially flat plate shape.

Description of Cap 2

As shown in FIG. 1 and FIGS. 3 to 6, the cap 2 is made of, for example, a resin member or the like. The cap 2 includes a mounting plate portion 20, a covering portion 21, and a water blocking wall portion 22. The covering portion 21 and the water blocking wall portion 22 protrude integrally from a surface of the mounting plate portion 20. The other surface of the mounting plate portion 20 is attached to the outer surface of the lamp housing 10 by adhesion or welding. As a result, the cap 2 is provided integrally with the lamp housing 10. The covering portion 21 and the water blocking wall portion 22 protrude outward relative to the outer surface of the lamp housing 10. The projecting amount (height) of the covering portion 21 and the projecting amount (height) of the water blocking wall portion 22 are equal to or substantially equal to each other.

The mounting plate portion 20 has a vertically long rectangular flat plate shape or a substantially flat plate shape on which the left and right sides and the lower side of the mounting plate portion 20 are fitted to the left and right sides and the lower side of the mounting convex portion 16. A convex portion 200 having a rectangular shape which is long in the horizontal direction is integrally provided on a central portion of an upper side of the mounting plate portion 20. The left and right corner portions of the convex portion 200 are fitted to the upper side of the mounting convex portion 16, respectively.

Figure 5:
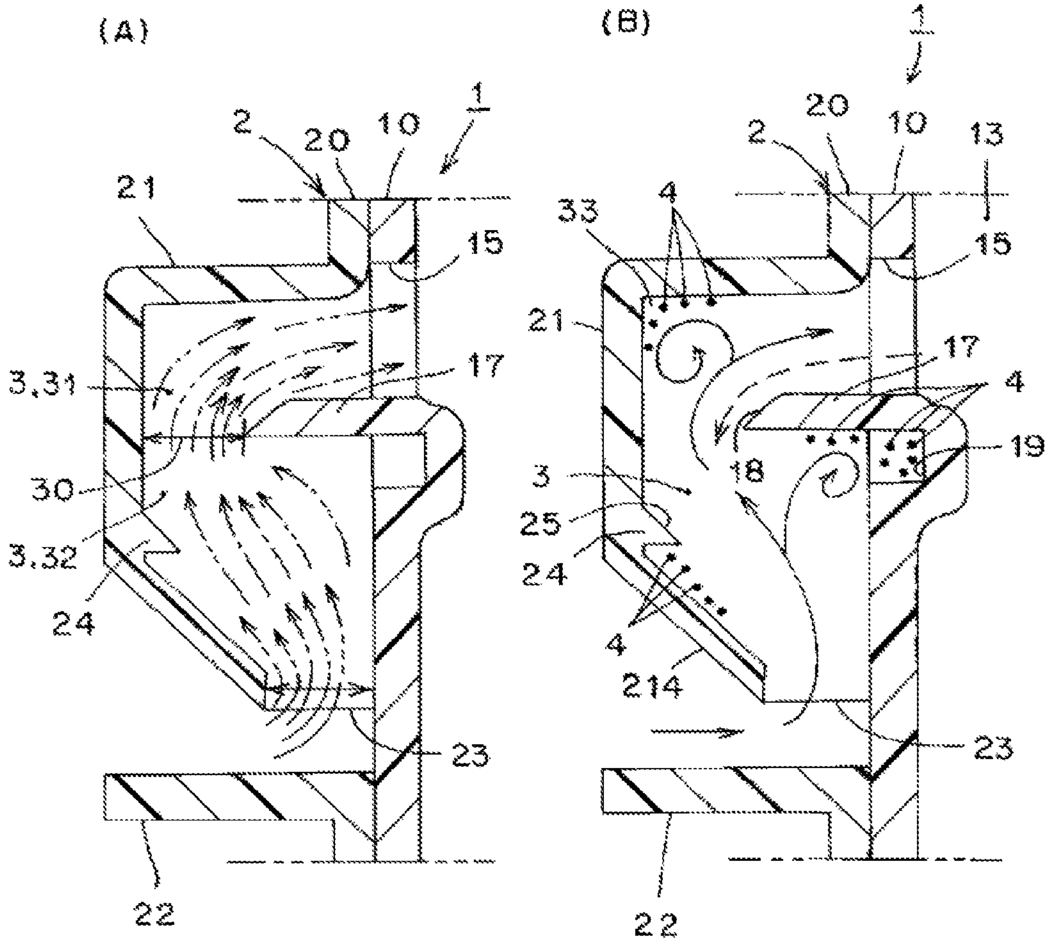
FIG. 5 are explanatory sectional views (sectional views corresponding to FIG. 1) showing the flow of air in a breathing passage formed in the lamp housing and the cap. (A) is an explanatory view showing the flow velocity and convection of the air. (B) is an explanatory view showing a state in which the air flows into the lamp chamber and a state in which the air flows out from the lamp chamber.
Figure 6:
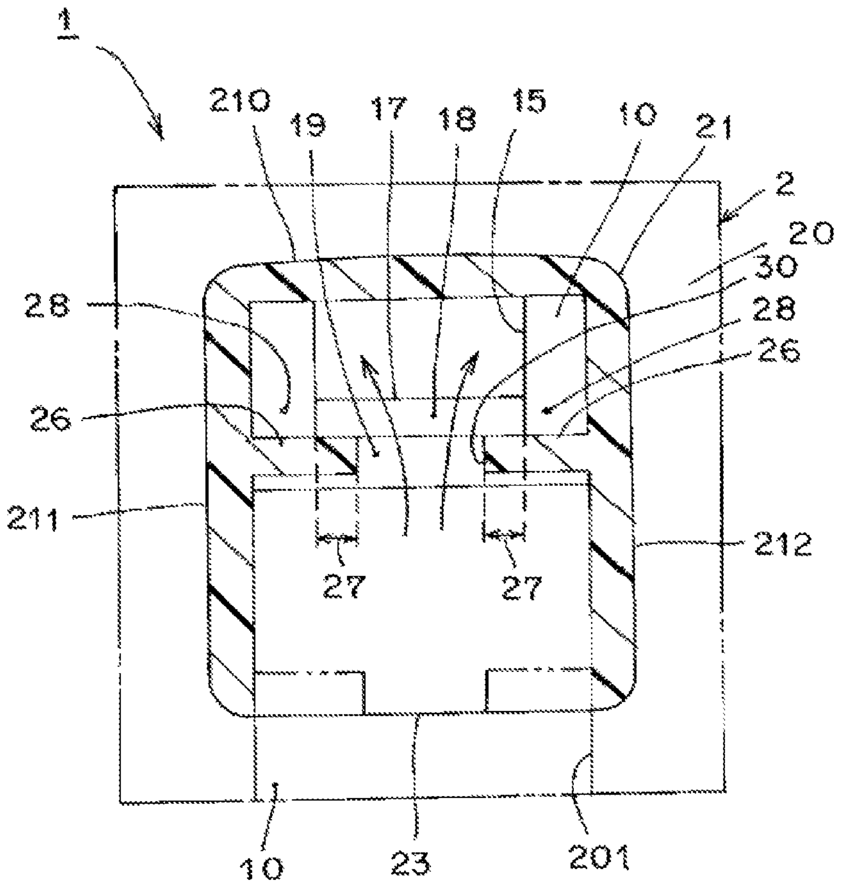
FIG. 6 is an explanatory sectional view (sectional view taken along line VI-VI in FIG. 1) showing a state where the air flows into the lamp chamber.

The mounting plate portion 20, the convex portion 200 and the mounting convex portion 16 have a function of preventing the upper and lower erroneous assembling when the cap 2 is attached to the lamp housing 10. An opening portion 201 having a rectangular shape which is long in the longitudinal direction is provided at the central portion of the mounting plate portion 20. As shown in FIGS. 1, 5 and 6, the opening portion 201 has a larger area than the breathing hole 15 of the lamp housing 10.

The covering portion 21 is integrally provided at an edge portion of the opening portion 201 of the mounting plate portion 20. The covering portion 21 has a flat wall 210 provided on an upper edge of the opening portion 201, left and right side walls 211, 212 located at approximately three quarters from the top of the left and right side edges of the opening portion 201, and a front wall 213 provided on the flat wall 210 and the left and right side walls 211 and 212. The covering portion 21 has a hollow shape and covers a portion around the breathing hole 15 of the lamp housing 10. In the embodiment, as shown in FIGS. 1, 5 and 6, the left and right sides and the lower side of the breathing hole 15 are covered. As shown in FIGS. 1 and 5, the portion on the upper side of the covering portion 21, that is, the portion on the side of a first breathing passage 31, which will be described later, has a hollow rectangular shape or a hollow cubic shape.

A lower portion 214 of the front wall 213 of the covering portion 21 is inclined toward the lamp housing 10. A breathing port 23 is provided at the lower end of an inclined wall 214 in the lower portion of the front wall 213, that is, at the lower surface (bottom surface) of the covering portion 21. The breathing port 23 communicates with the outside. That is, the breathing port 23 communicates with the space covered by the covering portion 21 (inside of the covering portion 21) with the outside of the lamp chamber 13 (outside the covering portion 21 and the external portion). The breathing port 23 is located below the breathing hole 15 of the lamp housing 10. That is, the breathing hole 15 is located above the breathing port 23. Note that, as shown by a two-dot chain line in FIG. 6, the cross-sectional area of the breathing port 23 may be equal to or substantially equal to the cross-sectional area of a throttle part 30.

The water blocking wall portion 22 is integrally provided at the lower edge of the opening portion 201 while facing the breathing port 23. The water blocking wall portion 22 has a chevron shape (a shape in which the center is bent upward at an obtuse angle) when viewed from the front (viewed from the rear side of the vehicle lamp 1). The water blocking wall portion 22 prevents water or rainwater (not shown) from entering a breathing passage 3 through the breathing port 23 from the outside.

Description of Breathing Passage 3

As shown in FIGS. 1, 5, and 6, the breathing passage 3 communicating between the breathing hole 15 and the breathing port 23 is provided between a portion covered with the cap 2 of the lamp housing 10 and the cap 2. The breathing passage 3 includes the first breathing passage 31, a second breathing passage 32 and the throttle part 30. The first breathing passage 31 is a breathing passage at the side of the breathing hole 15 with respect to a projecting part 17 provided in the lamp housing 10. The second breathing passage 32 is a breathing passage at the side of the breathing port 23 with respect to the projecting part 17. The throttle part 30 is a breathing passage between the tip of the projecting part 17 and the front wall 213 of the cap 2, and a part (venturi part) for throttling the middle part (intermediate part) of the breathing passage 3.

Description of Projecting Part 17

As shown in FIGS. 1, 5 and 6, the projecting part 17 projects integrally in the breathing passage 3, from the lower edge of the breathing hole 15 of the lamp housing 10 toward the front wall 213 of the cap 2. On the upper surface of the tip portion of the projecting part 17, an inclined surface 18 having an upward slope toward the breathing hole 15 is provided. The tip of the projecting part 17 projects toward the front wall 213 of the cap 2, more than the edge of the side of the inclined wall 214 of the breathing port 23 of the cap 2.

Description of Auxiliary Projecting Part 24

As shown in FIGS. 1 and 5, an auxiliary projecting part 24 is integrally provided on a portion of the front wall 213 of the cap 2 which is located at a position lower than a portion where the tip portion of the projecting part 17 faces (a portion above the inclined wall 214). The auxiliary projecting part 24 projects in the second breathing passage 32 from the cap 2 toward the lamp housing 10. The auxiliary projecting part 24 is provided alternately with the projecting part 17 of the lamp housing 10. The auxiliary projecting part 24 forms a cross section difference angular shape. The upper surface 25 of the auxiliary projecting part 24 is inclined to be equal to or substantially equal to the inclination angle of the inclined wall 214 of the cap 2. The inclination of the inclined surface 25 of the upper surface of the auxiliary projecting part 24 and the inclination of the inclined wall 214 are based on the degree of removal of the molding die of the cap 2.

Description of Recess 19

As shown in FIGS. 1, 5 and 6, a recess 19 is provided at a root portion on the side of the second breathing passage 32 of the projecting part 17 in the lamp housing 10, that is at a root portion on the lower side of the projecting part 17. The recess 19 is recessed toward the lamp chamber 13.

Description of Rib 26

As shown in FIGS. 1 and 6, ribs 26 are integrally provided inside the front wall 213 and the left and right side walls 211 and 212 of the cap 2, respectively. The upper surface of one of the ribs 26 is in contact with the lower surface on the left and right sides of the tip portion of the projecting part 17 of the lamp housing 10, that is, the surface on the side of the second breathing passage 32. A part 27 laps the rib 26 and the projecting part 17. By the lap portion 27 having the part which laps, it is possible to prevent a gap 28 from being formed between the left and right sides of the projecting part 17 and the left and right side walls 211 and 212. As a result, air reliably passes through the throttle part 30. Note that the lower surface of the rib 26 may be in contact with the upper surface on the left and right sides of the tip portion of the projecting part 17 of the lamp housing 10, that is, the face on the side of the first breathing passage 31.

Description of the Operation of the Embodiment

The vehicle lamp 1 according to the embodiment is configured as described above, and the operation will be described below.

The light source 14 of the lamp unit 12 is turned on. Then, the air in the lamp chamber 13 is warmed by the heat generated by the light source 14. By this, the external air (refer to the solid line arrow, the dashed-dotted line arrow, the dashed-two dotted line arrow and the dashed-three dotted line arrow in FIG. 5(A), and the solid line arrow in FIG. 5(B)) enters the lamp chamber 13 from the breathing port 23 through the breathing passage 3 (the second breathing passage 32, the throttle part 30 and the first breathing passage 31) and the breathing hole 15. Since the external air flows into the lamp chamber 13, it is possible to prevent condensation on the surfaces of the lamp housing 10 and the side of the lamp chamber 13 of the lamp lens 11. That is, it is possible to prevent the clouding of the lamp lens 11.

Note that FIG. 5(A) is an explanatory diagram showing the flow velocity and convection of the air in the breathing passage 3. The solid-line arrow, the dashed-dotted line arrow, the dashed-two dotted line arrow and the dashed-three dotted line arrow in FIG. 5(A) indicate the flow velocity of the air. That is, the solid arrow indicates the fastest flow rate, the dashed-dotted line arrow indicates the flow velocity following the flow velocity of the solid line arrow, the dashed-two dotted line arrow indicates the flow velocity following the flow velocity of the dashed-dotted line arrow, and the dashed-three dotted line arrow indicates the flow velocity following the flow velocity of the dashed-two dotted line arrow.

When the light source 14 of the lamp unit 12 is turned on, the air in the lamp chamber 13 (See the dashed line arrow in FIG. 5(B)) is discharged from the breathing hole 15 to the outside through the breathing passage 3 (the first breathing passage 31, the throttle part 30 and the second breathing passage 32) and the breathing port 23.

Description of Effect of the Embodiment

The vehicle lamp 1 according to the embodiment has the structure and operation described above, and the effect will be described below.

Since dust 4 in the air (refer to the small black circle in FIG. 5(B)) hits the projecting part 17, by the projecting part 17 which divides the breathing passage 3 into the first breathing passage 31 and the second breathing passage 32, the vehicle lamp 1 according to the embodiment can reliably prevent the dust 4 from entering the lamp chamber 13 from the breathing hole 15. Moreover, according to the vehicle lamp 1 according to the embodiment, as shown by the solid line arrows in FIG. 5(B), when the air hits the projecting part 17, a vortex is generated in the air convection, the dust 4 is discharged to the outside from the breathing port 23 by the vortex. As a result, the vehicle lamp 1 according to the embodiment can allow only the air to flow from the breathing hole 15 to the lamp chamber 13.

The vehicle lamp 1 according to the embodiment can shake off the dust 4 and allow only the air to flow from the breathing hole 15 into the lamp chamber 13 because the convection flow velocity of the air passing through the throttle part 30 is high by the throttle part 30 between the projecting part 17 and the cap 2.

In the vehicle lamp 1 according to the embodiment, the breathing passage 3 is provided between the lamp housing 10 and the cap 2, by providing the lamp housing 10 with the cap 2 and covering the peripheral portion of the breathing hole 15 of the lamp housing 10 with the cap 2. For this reason, the vehicle lamp 1 according to the embodiment can reduce (decrease) the projection amount (height) of the cap 2 from the lamp housing 10, based on the projection amount (height) of the projecting part 17 provided in the lamp housing 10. That is, the vehicle lamp 1 according to the embodiment can reduce (decrease) the projection amount (height) of the cap 2 from the lamp housing 10, and can downsize (shrink) the respiratory structure, compared with the projection amount (height) from the housing of the dust removal means of the PTL 1, and the projection amount (height) from the lamp body of the cylinder and the cap of the PTL 2.

Since the upper surface of the tip portion of the projecting part 17 is the inclined surface 18 of the upward slope toward the breathing hole 15, the convection of air passing through the throttle part 30 becomes smooth, so the vehicle lamp 1 according to the embodiment can shake off the dust 4 and allow only the air to flow from the breathing hole 15 into the lamp chamber 13. As a result, the vehicle lamp 1 according to the embodiment can reliably prevent the dust 4 from entering the lamp chamber 13 from the breathing hole 15.

Moreover, the vehicle lamp 1 according to the embodiment can smoothly discharge the moisture (not shown) in the lamp chamber 13 together with the air (See the dashed line arrow in FIG. 5(B)) in the lamp chamber 13 from the breathing hole 15 through the breathing passage 3 (the first breathing passage 31, the throttle part 30 and the second breathing passage 32) and the breathing port 23 to the outside, so that clouding of the lamp lens 11 can be prevented.

In the vehicle lamp 1 according to the embodiment, since the auxiliary projecting part 24 is provided on the cap 2 alternately with the projecting part 17 of the lamp housing 10, the dust 4 in the air hits the auxiliary projecting part 24 and is then discharged from the breathing port 23 along the inclined wall 214 to the outside. As a result, the vehicle lamp 1 according to the embodiment can reliably prevent the dust 4 from entering the lamp chamber 13 from the breathing hole 15.

In the vehicle lamp 1 according to the embodiment, since the recess 19 is provided at the side of the second breathing passage 32 of the projecting part 17 of the lamp housing 10, that is, on the root portion opposite to the breathing hole 15, the vortices are generated in the air convection upon hitting the projecting part 17, and the vortex flow velocity is slower than the convection velocity of the air passing through the throttle part 30. For this purpose, the vehicle lamp 1 according to the embodiment can capture the dust 4 in the air in the recess 19, and it is possible to prevent the dust 4 from entering the lamp chamber 13 from the breathing hole 15. Note that the dust 4 captured in the recess 19 is discharged to the outside from the recess 19 through the breathing port 23 by the vibration of the vehicle.

In the vehicle lamp 1 according to the embodiment, since the upper portion of the cap 2, that is, the portion of the side of the first breathing passage 31 has a hollow rectangular shape or a hollow cubic shape, the corner of the upper portion of the cap 2 is apart from the tip of the projecting part 17 of the lamp housing 10. By this, in the vehicle lamp 1 according to the embodiment, since the convection velocity of the air at the corner of the upper portion of the cap 2 is slower than the majority of velocity of the air at the throttle part 30, a stagnation portion 33 is formed at the corner of the upper part of cap 2, and, in the stagnation portion 33, the dust 4 in the air falls without getting into the air convection. As a result, the vehicle lamp 1 according to the embodiment can reliably prevent the dust 4 from entering the lamp chamber 13 from the breathing hole 15. Note that the dust 4 dropped at the stagnation portion 33 is smoothly discharged to the outside through the first breathing passage 31, the throttle part 30, the second breathing passage 32, and the breathing port 23.

In the vehicle lamp 1 according to the embodiment, the ribs 26 are respectively provided on the inner surfaces of the front wall 213 of the cap 2 covering the breathing hole 15 and the right and left side walls 211 and 212, the ribs 26 in left and right are in contact with the lower surfaces of the left and right sides of the tip portion of the projecting part 17, that is, the surface of the side of the second breathing passage 32, and the part 27 of the rib 26 and the projecting part 17 are lapped to each other. As a result, the vehicle lamp 1 according to the embodiment can prevent the gap 28 from being formed between the left and right sides of the projecting part 17 and the left and right side walls 211 and 212 by the lap portion 27, and thus can reliably pass the air into the throttle part 30. As a result, in the vehicle lamp 1 according to the embodiment, since the dust 4 in the air hits the projecting part 17 by passing the air through the throttle part 30 at a high flow rate, it is possible to reliably prevent the dust 4 from entering the lamp chamber 13 from the breathing hole 15.

Moreover, in the vehicle lamp 1 according to the embodiment, the ribs 26 are respectively provided on the inner surface of the front wall 213 of the cap 2 covering the breathing hole 15 and the right and left side walls 211 and 212, and since the ribs 26 in right and left are in contact with the lower surfaces of the left and right sides of the tip portion of the projecting part 17, that is, the surface on the side of the second breathing passage 32, the ribs 26 serve as positioning and guides when attaching the cap 2 to the lamp housing 10.

In the vehicle lamp 1 according to the embodiment, since the breathing holes 15 and the cap 2 are provided at a portion apart from the lamp unit 12, that is, the light source 14 serving as a heat source, and in a portion that is easily cloudy, clouding of a portion of the lamp lens 11 which is likely to be cloudy can be reliably eliminated.

In the vehicle lamp 1 according to the embodiment, by equalizing or substantially equalizing the cross-sectional area of the breathing port 23 and the cross-sectional area of the throttle part 30, the cross-sectional area of the breathing port 23 at the entrance of the second breathing passage 32 and the cross-sectional area of the throttle part 30 at the entrance of the first breathing passage 31 can be made equal or substantially equal. As a result, since the amount and flow rate of the air flowing into the second breathing passage 32 from the breathing port 23 can be equal to or substantially equal to the amount and flow rate of the air flowing into the first breathing passage 31 from the throttle part 30, the vehicle lamp 1 according to the embodiment can flow the air smoothly, therefore, it can reliably prevent the dust 4 from entering the lamp chamber 13 from the breathing hole 15 and, also, in particular, reliably eliminate the clouding of the lamp lens 11.

Description of Examples Other Than the Embodiment

Note that, in the embodiment described above, the convex portion 200 for preventing the upper and lower erroneous assembling of the cap 2 to the lamp housing 10 is provided on the upper side of the mounting plate portion 20. However, in the present invention, the convex portion 200 may be provided on the lower side of the mounting plate portion 20. In this case, the lower side of the mounting convex portion 16 of the lamp housing 10 is set to a V-shaped shape (a shape in which the center is bent downward at an obtuse angle). Also, the shapes of the upper side and the lower side of the convex portion 200 and the mounting convex portion 16 are not particularly limited.

Also, in the above embodiment, the ribs 26 in contact with the lower side surfaces on the left and right sides of the tip portion of the projecting part 17 are provided on the front wall 213 and the left and right side walls 211 and 212 of the cap 2 respectively. However, in the present invention, it is not necessary to provide the ribs 26. In this case, by adjusting the width between the left and right side walls 211 and 212 of cap 2 to the left and right width of projecting part 17 of the lamp housing 10, it can prevent the gap 28 (see FIG. 6) from being formed between the left and right sides of the projecting part 17 and the left and right side walls 211, 212. In this case, a small convex portion for positioning and guiding the lamp housing 10 and cap 2 may be provided.

Further, in the embodiment described above, a single breathing hole 15 and a single cap 2 are provided. However, in the present invention, a plurality of breathing hole 15 and a plurality of caps 2 may be provided.

Further, in the above embodiment, the vehicle lamp 1 is a vehicle headlamp (headlamp) provided on both left and right sides of the front portion of the vehicle. However, in the present invention, the vehicle lamp may be a rear combination lamp, a fog lamp, a daytime running lamp, or the like, besides the vehicle headlamp (head lamp).

It should be noted that the present invention is not limited to the above embodiments.

REFERENCE SIGNS LIST

1 vehicle lamp
10 lamp housing
11 lamp lens
12 lamp unit
13 lamp chamber
14 light source
15 breathing hole
16 mounting convex portion
17 projecting part
18 inclined surface
19 recess
2 cap
20 mounting plate portion
200 convex portion
201 opening portion
21 covering portion
210 flat wall
211, 212 left and right side walls
213 front wall
214 inclined wall
22 water blocking wall
23 breathing port
24 auxiliary projecting part
25 inclined surface
26 rib
27 lap portion
28 gap
3 breathing passage
30 throttle part
31 first breathing passage
32 second breathing passage
33 stagnation portion
4 dust

The invention claimed is:

1. A vehicle lamp comprising:
a lamp housing comprising a lamp chamber and a breathing hole communicating with the lamp chamber; and
a cap provided on an opposite side to the lamp chamber of the lamp housing, the cap covering a peripheral portion of the breathing hole and comprising a breathing port communicating with an outside, wherein:
the breathing hole is positioned above the breathing port,
the peripheral portion covered by the cap provides a breathing passage that communicates between the breathing hole and the breathing port, and
a projecting part that throttles the breathing passage is provided on the lamp housing and projects into the breathing passage through the breathing hole.

2. The vehicle lamp according to claim 1,
wherein an upper surface of a tip portion of the projecting part is provided with a slope inclined upward toward the breathing hole.

3. The vehicle lamp according to claim 1,
wherein the breathing passage comprises a first breathing passage on a side of the breathing hole with respect to the projecting part, a second breathing passage on a side of the breathing port with respect to the projecting part, and the throttle part between the tip of the projecting part and the cap, and
wherein an auxiliary projecting part projecting toward the lamp housing in the second breathing passage is provided alternately with the projecting part at or near a portion of the cap where the tip portion of the projecting part faces.

4. The vehicle lamp according to claim 3,
wherein a recess recessed toward the lamp chamber is provided on a root portion on a side of the second breathing, passage of the projecting part of the lamp housing.

5. The vehicle lamp according to claim 3, wherein the portion of a side of the first breathing passage of the cap comprises a hollow rectangular shape or a hollow cubic shape.

6. The vehicle lamp according to claim 3, wherein the cap comprises a flat wall covering the breathing hole, a front wall and right and left side walls, and wherein a plurality of ribs in contact with one of a side of the first breathing passage and a side of the second breathing passage of the left and right sides of the tip portion of the projecting part are respectively provided on the inner surfaces of the front wall and the left and right side walls of the cap.

7. A vehicle lamp comprising:

a lamp housing comprising a lamp chamber and a breathing hole communicating with the lamp chamber; and a cap provided on an opposite side to the lamp chamber of the lamp housing, the cap covering a peripheral portion of the breathing hole and comprising a breathing port communicating with an outside, wherein:

the breathing hole is positioned above the breathing port, a breathing passage is provided between a portion covered with the cap of the lamp housing and the cap to communicate between the breathing hole and the breathing port, and a projecting part is provided on the lamp housing to throttle the breathing passage, wherein an upper surface of a tip portion of the projecting part is provided with a slope inclined upward toward the breathing hole.

8. A vehicle lamp comprising:

a lamp housing comprising a lamp chamber and a breathing hole communicating with the lamp chamber; and a cap provided on an opposite side to the lamp chamber of the lamp housing, the cap covering a peripheral portion of the breathing hole and comprising a breathing port communicating with an outside, wherein:

the breathing hole is positioned above the breathing port, a breathing passage is provided between a portion covered with the cap of the lamp housing and the cap to communicate between the breathing hole and the breathing port, and a projecting part is provided on the lamp housing to throttle the breathing passage, wherein the breathing passage comprises a first breathing passage on a side of the breathing hole with respect to the projecting part, a second breathing passage on a side of the breathing port with respect to the projecting part, and the throttle part between the tip of the projecting part and the cap, and wherein an auxiliary projecting part projecting toward the lamp housing in the second breathing passage is provided alternately with the projecting part at or near a portion of the cap where the tip portion of the projecting part faces.

* * * * *